United States Patent
Fazan et al.

(10) Patent No.: US 9,718,687 B2
(45) Date of Patent: Aug. 1, 2017

(54) METHOD OF CONVERTING LIMESTONE INTO TRI-CALCIUM PHOSPHATE AND TETRA-CALCIUM PHOSPHATE POWDER SIMULTANEOUSLY

(75) Inventors: Fazilah Binti Fazan, Shah Alam (MY); Sudirman Bin Sahid, Shah Alam (MY); Wan Ruzaini Bin Wan Sulaiman, Shah Alam (MY); Nor Shahida Binti Kader Bashah, Shah Alam (MY)

(73) Assignee: SIRIM Berhad, Shah Alam (MY)

( * ) Notice: Subject to any disclaimer, the term of this patent is extended or adjusted under 35 U.S.C. 154(b) by 625 days.

(21) Appl. No.: 13/981,767

(22) PCT Filed: Sep. 29, 2011

(86) PCT No.: PCT/MY2011/000211
§ 371 (c)(1),
(2), (4) Date: Jul. 25, 2013

(87) PCT Pub. No.: WO2012/102602
PCT Pub. Date: Aug. 2, 2012

(65) Prior Publication Data
US 2013/0309308 A1    Nov. 21, 2013

(30) Foreign Application Priority Data
Jan. 27, 2011   (MY) .............................. PI2011000389

(51) Int. Cl.
C01B 25/32      (2006.01)

(52) U.S. Cl.
CPC ............ *C01B 25/328* (2013.01); *C01B 25/32* (2013.01); *C01B 25/322* (2013.01); *C01P 2002/72* (2013.01); *C01P 2004/61* (2013.01)

(58) Field of Classification Search
CPC ...... C01B 25/328; C01B 25/32; C01B 25/322; C01P 2004/61; C01P 2004/72
See application file for complete search history.

(56) References Cited

U.S. PATENT DOCUMENTS

| 4,717,556 A | 1/1988 | Kawamura et al. |
| 4,891,198 A | 1/1990 | Ackilli et al. |

(Continued)

FOREIGN PATENT DOCUMENTS

| CN | 101 264 871 A | 9/2008 |
| CN | 101 773 817 A | 7/2010 |

(Continued)

OTHER PUBLICATIONS

Kubota et al., Dental cements containing .alpha.-tricalcium phosphate and tetracalcium phosphate. CAPLUS, Chemical Abstracts Service. Accession No. 1991:49651.

(Continued)

*Primary Examiner* — Richard M Rump
(74) *Attorney, Agent, or Firm* — Wolf, Greenfield & Sacks, P.C.

(57) ABSTRACT

The present invention relates to a method of converting limestone into tri-calcium phosphate (TCP) and tetra-calcium phosphate (TTCP) powder simultaneously. In particular, the method provides for a method of converting limestone into TCP and TTCP powder simultaneously having specific particle size and with specific crystallographic structure.

21 Claims, 10 Drawing Sheets

(56) References Cited

U.S. PATENT DOCUMENTS

| | | | |
|---|---|---|---|
| 5,011,495 A | | 4/1991 | Hollinger |
| 5,137,534 A | * | 8/1992 | Sumita .................. A61L 27/12 433/201.1 |
| 5,536,575 A | | 7/1996 | Imura et al. |
| 5,569,490 A | | 10/1996 | Imura et al. |
| 5,652,016 A | | 7/1997 | Imura et al. |
| 5,679,294 A | | 10/1997 | Umezu et al. |
| 5,709,742 A | | 1/1998 | Fulmer et al. |
| 6,569,396 B1 | | 5/2003 | Yanagi et al. |
| 7,270,705 B2 | | 9/2007 | Lin et al. |
| 7,754,174 B2 | | 7/2010 | Kuzma |
| 2006/0263443 A1 | | 11/2006 | Chow et al. |

FOREIGN PATENT DOCUMENTS

| | | |
|---|---|---|
| EP | 1473273 A1 | 11/2004 |
| JP | 2-207011 A | 8/1990 |

OTHER PUBLICATIONS

Kutty, Thermal decomposition of hydroxylapatite. Indian J Chem. 1973;11(7):695-7.

Wang, Composite adsorption material with good regenerability for wastewater treatment and preparation method thereof . CAPLUS Chemical Abstracts Service. Accession No. 2010-900496.

\* cited by examiner

METHOD OF CONVERTING LIMESTONE INTO TRI-CALCIUM PHOSPHATE AND TETRA-CALCIUM PHOSPHATE POWDER SIMULTANEOUSLY

RELATED APPLICATION

This application is a national stage riling under 35 U.S.C. §371 or international application PCT/MY2011/000211, filed Sep. 29, 2011 which was published under PCT Article 21(2) in English, and claims foreign priority benefits under 35 U.S.C. §119(a)-(d) or 35 U.S.C. §365(b) of Malaysian application number PI2011000389, filed Jan. 27, 2011, the contents of which are herein incorporated by reference in their entireties.

FIELD OF THE INVENTION

The present invention relates to a method of converting limestone into tri-calcium phosphate (TCP) and tetra-calcium phosphate (TTCP) powder simultaneously. In particular, the method provides for a method of converting limestone into TCP and TTCP powder simultaneously having specific particle size and with specific crystallographic structure.

BACKGROUND OF THE INVENTION

Current commercial methods of producing TCP or TTCP are well known in the art. Different amounts of calcium source mixed with phosphate source using different techniques will produced either TCP or TTCP alone.

U.S. Pat. No. 4,891,198 on the preparation of TCP only shows that the addition of phosphoric acid to the calcium base will first resulted in the formation of hydroxyapatite, then towards monocalcium phosphate to dicalcium phosphate before finally being converted into tricalcium phosphate (TCP) slurry at pH between 8-12 and at reaction temperature of not less than 70° C. The reacted slurry was then spray dried to form TCP powder. Another method of producing TCP (U.S. Pat. No. 7,754,174) uses similar method as the above but with the addition of acetic acid to control the viscosity of the slurry during reaction, and the usage of double drum dryer to produce TCP powder. This method produces only small amount of powder (i.e. ~72% water and ~28% solid), but with higher production costs due to large amount of energy needed to operate the double drum dryer. Other methods of producing TCP powder alone were also described in U.S. Pat. Nos. 6,569,396, 5,011,495, 4,891,198, 4,717,556 and 5,679,294. These US patents taught almost similar techniques of producing TCP powder, but none shown to produce TCP and TTCP simultaneously.

European Patent No. 14732731 described a method of using starting formulations by mixing an aqueous calcium nitrate $[Ca(NO_3)_2.4H_2O]$ to an aqueous ammonium mono phosphate $[(NH_4)_2HPO_4]$ and ammonium hydroxide $[NH_4OH]$ before calcining the resulting mixture at a temperature of 800° C. to produce TCP. However this technique tends to form hydroxyapatite instead due to the temperature of the reaction system which is raised by the heat of the reaction. Other method of using starting formulations is described in U.S. Pat. No. 4,717,556 wherein hydrogen calcium phosphate, calcium carbonate $[CaCO_3]$ and water in the amount of 5-15 wt % solid concentrations and subjecting the slurry to the attrition mixing reaction. Despite this method requires the use of attrition reactor for efficient mixing, the reaction product still requires long ageing time process to form TCP.

The current methods of producing TTCP utilize a variety of formulations and techniques. U.S. Pat. No. 5,709,742 shows the method of calcining a calcium source and a phosphorus source at temperatures greater than 1400° C. and with the addition of alumina oxide $[Al_2O_3]$ compound and forced cooling (greater than 10° C./min cooling rate) of the resulting product in the calciner furnace. This method, however, is technically difficult and easily causes damage to the refractory materials of the furnace due to rapid cooling process. U.S. Pat. No. 7,270,705 shows another method of producing TTCP only by reacting dicalcium pyrophosphate with calcium carbonate $[CaCO_3]$ in ethanol for 12 hours, followed by heating the mixture in an oven to dry the powder. The powder is then subjected to heating at 1400° C. to form TTCP. The use of ethanol, however, is highly critical due to its flammable nature and the need in this technique to dry it by oven heating. Small quantity TTCP production may not be critical, but for large scale TTCP manufacturing, it may be hazardous where the ethanol fume is being released into the air in large quantity continuously.

Other methods of producing TTCP powder alone were also described in various US Patents, such as for example, U.S. Pat. Nos. 5,536,575, 5,652,016, 5,569,490 and 4,891,198. These US patents taught almost similar techniques of producing TTCP powder, but none shown to produce TCP and TTCP simultaneously.

Therefore this invention shows the way to produce both TCP and TTCP at almost equal amount simultaneously. The combination of TCP and TTCP having specific particle size and with specific crystallographic structure provided a composite material, which will uniquely combine both chemical properties, as well as mechanical and resorbable properties of both materials. They can be applied in the fields of medical applications as bioresorbable bone graft materials, as fine chemicals, as column fillers for protein separation, as food supplement, and in agriculture as fertilizers.

BRIEF SUMMARY OF THE INVENTION

According to the first aspect of the present invention, there is provided a method of converting limestone into tri-calcium phosphate (TCP) and tetra-calcium phosphate (TTCP) powder simultaneously, said method comprising the steps of:
 a. synthesis of slurry apatite from limestone,
 b. spray drying of slurry apatite obtained in step (a) to obtain raw apatite powder,
 c. firing of raw apatite powder obtained in step (b) to obtain TCP and TTCP coarse powder simultaneously,
 d. grinding of TCP and TTCP coarse powder obtained in step (c) to produce TCP and TTCP powder of the desired particle size range.

According to another aspect of the present invention, the method provides for the production of a TCP and TTCP powder having specific particle size.

The method of the present invention will now be described in detail below.

DESCRIPTION OF THE PREFERRED EMBODIMENT

Figure 1:
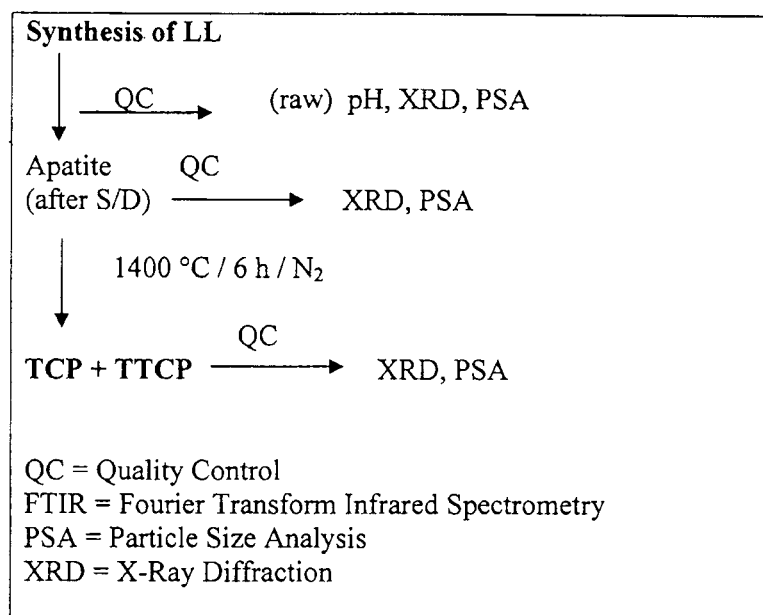
FIG. 1 shows the summary of the overall process for producing TCP+TTCP, wherein local limestone mixture is synthesized, washed and spray dried to produce raw apatite, which is further fired to obtain TCP+TTCP.

Disclosed is a method for producing tri-calcium phosphate and tetra-calcium phosphate (TCP+TTCP) mixture using local limestone as the starting raw material, and is as summarized in FIG. 1.

Step 1: Synthesis of Local Limestone

Figure 2:
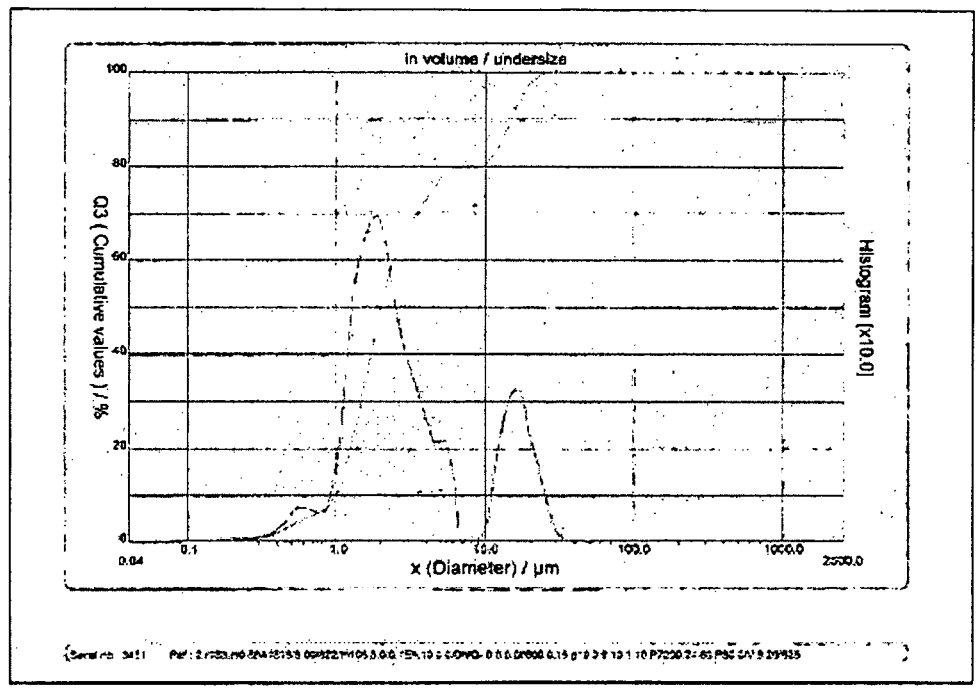
FIG. 2 shows the particle size distribution of raw Malaysian limestone.

Day 1: Preparation:

During the first day, 104.46 g of local limestone (Lime & Lime Products Sdn. Bhd., Baling Kedah) is weighed on an Analytical balance (Precisa) using a plastic spatula and a 3000 ml beaker. The limestone has the bi-modal particle size range of between 0.1-10 microns with median at 2 microns, and 10-30 microns with median at 15 microns as shown in FIG. 2. The crystallographic structure of limestone is shown in the x-ray diffraction spectra of FIG. 3.

Then 1250 ml of double distilled deionised water (DDI water) from DDI water machine (Aquatron, A4000D) is prepared in a measuring cylinder and mixed with the local limestone in the 3000 ml beaker. This beaker is placed on a hot-plate (Favorit, HP07707V2) and assembled with a stirrer, which has an approximate length of 6 inches. It is made sure that the set up has a mechanical stirrer (IKA, Eurostar) at a frequency of rotation of approximately 300 to 3.10 rpm. The beaker is covered with an aluminum foil and labeled with label sticker, and stirred overnight for 24 hours.

Day 2: Synthesis:

Before synthesis, the set up should have a calibrated pH Meter (SensION) on stand-by. During the second day, 86.4 g (~55 ml) of Ortho Phosphoric acid (85% concentration $H_3PO_4$, JT Baker) is weighed in a 100 ml beaker and poured in a 500 ml funnel, which is placed in the retort stand ring. 75 ml of DDI water is measured in a 100 ml beaker and is added to the 500 ml funnel containing the acid. This mixture is homogenously mixed by pouring into a beaker and then pouring back into the funnel and repeating this sequence for a few times until the water and the acid are mixed well. The hot plate (Favorit, HP07707V2) is turned ON and the 3000 ml beaker containing local limestone mixture that was prepared during the first day is placed on the hot plate. A thermometer is placed in to make sure that the temperature stably hovers between 75° C.-80° C. The pH is measured, which would be about 11.0. At a temperature between 75° C.-80° C. and with a constant stirring between 300-310 rpm, the $H_3PO_4$+DDI water mixture is slowly added drop by drop to the local limestone mixture. The pH is measured after adding $H_3PO_4$+DDI water mixture completely by dropping, (approximately for 1 h) which would be about 10.0. The acid mixture is further added until pH of the limestone mixture reaches about 7.0±0.1. The heater is switched OFF and the mixture is allowed to cool down to 30° C. The pH is measured at 30° C., which would be around 7.5. The mixture is left overnight to obtain a gelatinous mixture with shiny surface. This is an acid-base reaction whereby the final product is expected to be salt and neutral water (thus pH ~7). Therefore the amount of acid used will depend on the amount of limestone used to produce a complete salt and water reaction.

Day 3: Sedimentation:

The next day, the pH of the gelatinous limestone mixture is measured, which would be in the range of 7.1 to 7.4. The heater is turned ON and it is made sure that the temperature is stable between 75° C.-80° C. The pH is measured and in case of it being greater than 7.5, the mixture is adjusted to neutral pH with $H_3PO_4$+DDI water mixture. The stirrer and heater are turned OFF and the whole set was left overnight (24 hours).

Day 4: Washing 1:

To perform the first wash step, the supernatant water is first poured out from the beaker leaving behind the gelatinous mixture. The mixture is then stirred with a spatula and then transferred to a bottle. DDI water is added to the bottle; then the bottle was shaken well and again left overnight (24 hours).

Day 5: Washing 2:

The next day, to perform the second wash step, the supernatant water is again poured out from the bottle. Fresh DDI water is added in; the bottle was shaken well and left overnight (24 hours).

Step 2: Spray Drying Process

The gelatinous apatite slurry was collected from Step 1 (i.e. after supernatant is poured out leaving behind concentrated gelatinous apatite mixture), and then spray dried using a spray dryer (Lab Scale Mobile Minor Type H Spray Dryer, GEA-Niro, Denmark). The processes prior to spray drying are as follows: the weight of the apatite slurry is recorded, along with the specific gravity using SG bottle (Duran) in the range of 0.9-1.2. Viscosity of the apatite slurry is also measured using a Viscometer (Brookefield; Spindle 1; rpm~100) in the range of 50-200 cps. These values are recorded for the reproducibility tracking purposes. Then the slurry mixture is stirred using a mechanical stirrer (IKA) at 300-350 rpm until homogenous slurry is obtained.

Prior to spray drying, the spray dryer inlet temperature is set to 280° C. and an outlet temperature of not more than 120° C. The compressed air is turned on to ~0.05 MPa to 0.3 MPa (~0.5-3 bar) and 50-70% air on the flow meter. This is followed by turning on the feed pump (Brand Watson Marlow 505s) in the range of 20-45 rpm. To spray dry, DDI water is slowly fed first into the atomizer until the required outlet temperature is stable ~85°-95° C. Then the feed pump is switched from DDI water to the gelatinous apatite slurry. The air pressure is kept constant in order to obtain homogenous atomization. Decreasing pressure results in increasing particle size and vice versa. It should be noted that too large particles will result in wet chamber deposits, whereas too high pressure will result in deposits on the chamber roof.

Figure 4:
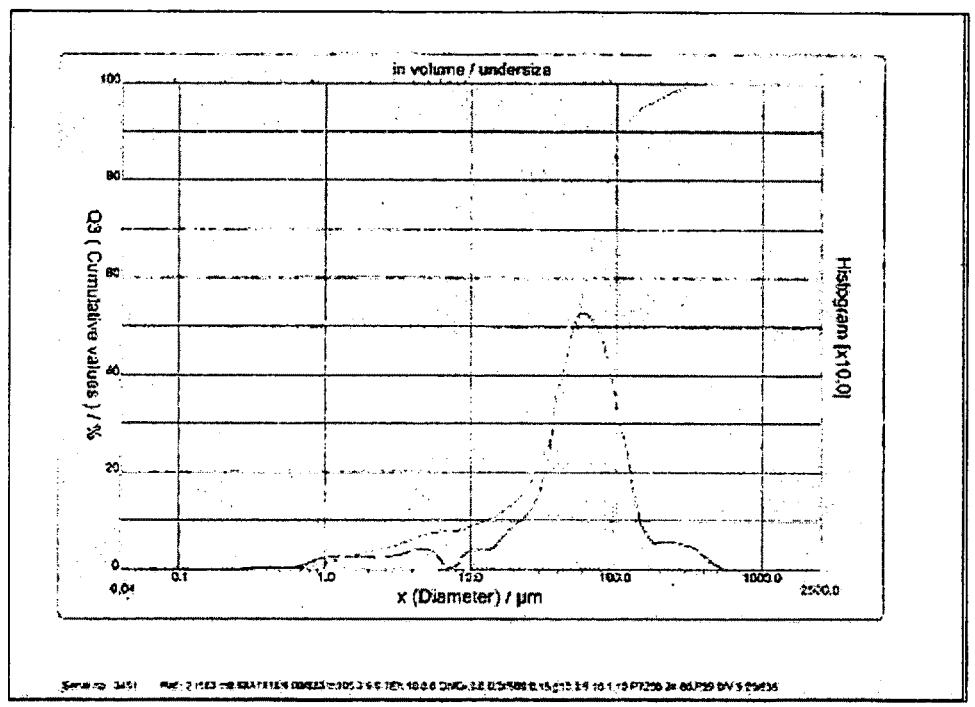
FIG. 4 shows the particle size distribution of spray-dried apatite powder.

Once the spray drying process is completed, the spray dried apatite powder is collected from the glass-jar collector at the bottom of the spray dryer. The particle size range of the spray dried apatite powder obtained is single modal between 1-300 microns with median at ~55 microns as shown in FIG. 4. The powder is then tested for its crystallographic structure using XRD, and the XD spectrum is recorded in FIG. 5.

Step 3: Firing

Figure 6:
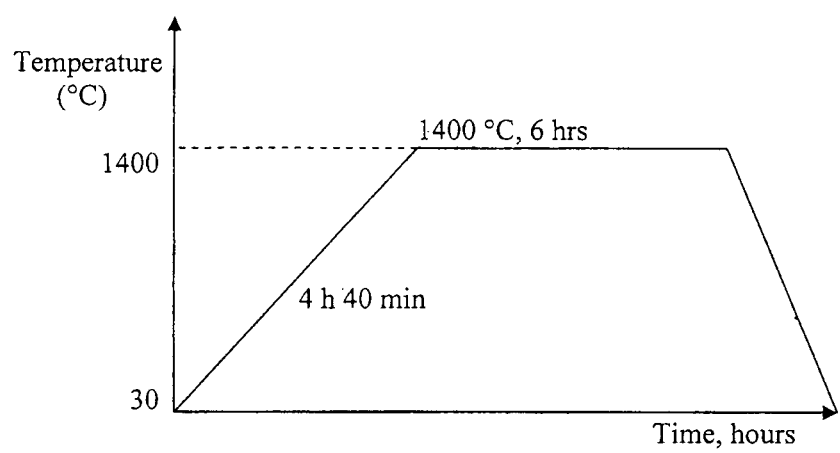
FIG. 6 shows a graph displaying the temperature in ° C. over time in hours generated by the firing of raw apatite powder to obtain TCP+TTCP.
Figure 7:
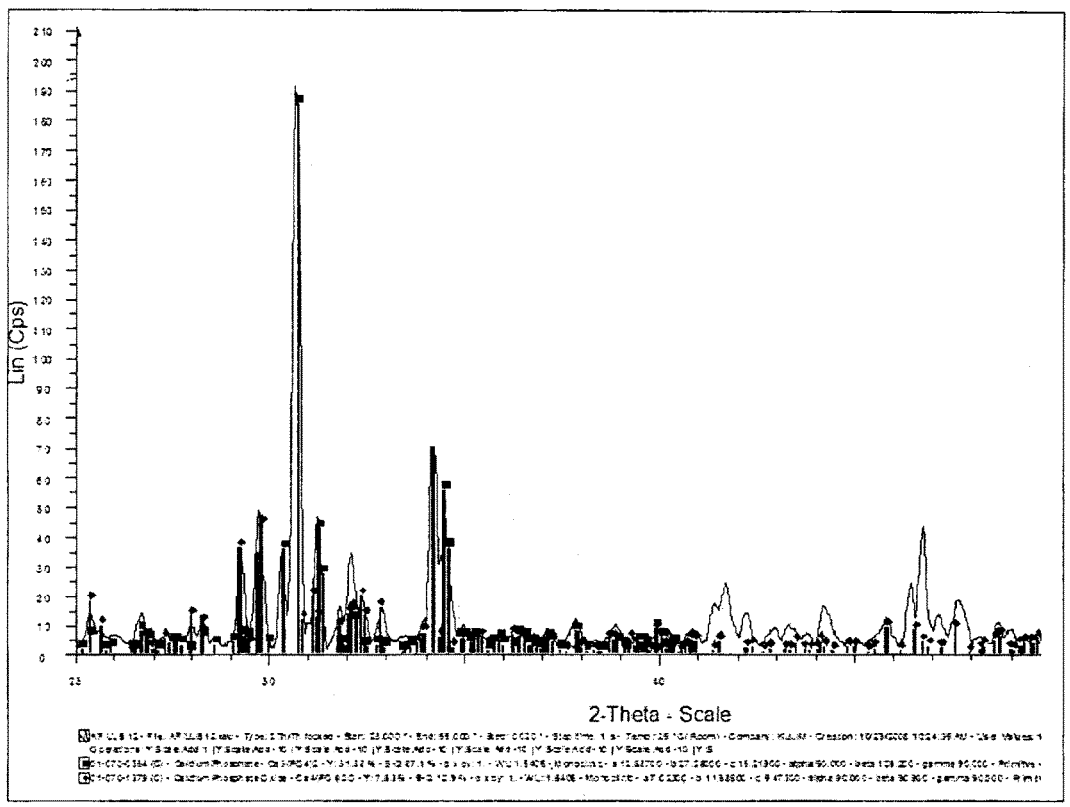
FIG. 7 shows the X-ray diffraction spectra of TCP and TTCP powder obtained according to the method of the present invention.

Elite Tube Furnace (Elite Thermal Systems LTD, UK) is used for firing of the raw apatite powder to obtain TCP+TTCP. The firing process is conducted by putting the apatite powder in an $Al_2O_3$ boat and set into the tube furnace. The maximum firing temperature is set at 1400° C. from room temperature 30° C. with a heating rate of 5° C./min; which usually takes about 4 hours 40 minutes to reach 1400° C. Once at 1400° C., the soaking time was set for 6 hours, before the furnace was let to cool naturally back to room temperature. This is shown in the firing profile of FIG. 6. To maintain tube furnace atmospheric condition, nitrogen [$N_2$] gas (purified grade: 99.99%) is continuously fed into the tube furnace from beginning until the end of the firing process. The apatite fired is to form TCP+TTCP and is shown in the XRD spectrum of FIG. 7.

Figure 8:
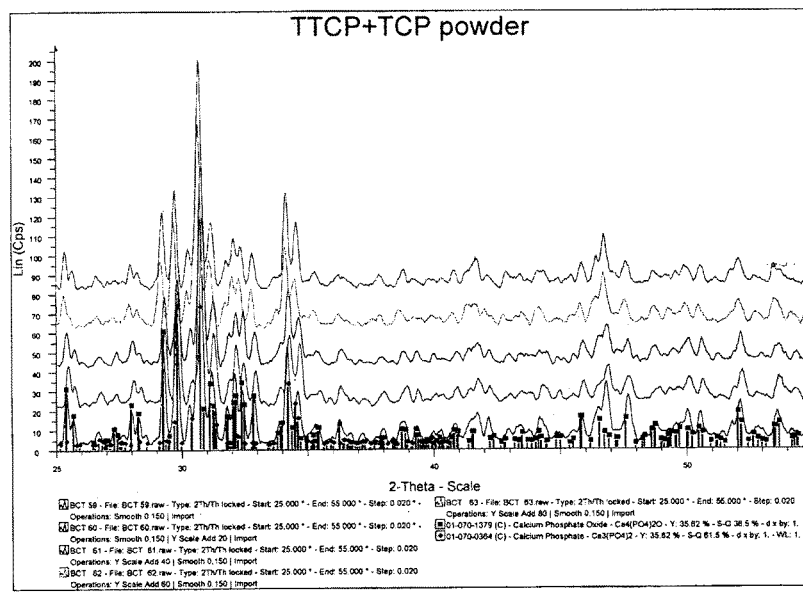
FIG. 8 shows the X-ray diffraction spectra of different batches showing reproducibility in the production of TCP and TTCP powder using the method of the present invention.

FIG. 8 shows the XRD spectrum of different batches of apatite powder that have been fired at 1400° C. in the tube furnace, showing the reproducibility of the formation of TCP+TTCP simultaneously.

Step 4: Grinding

Figure 9:
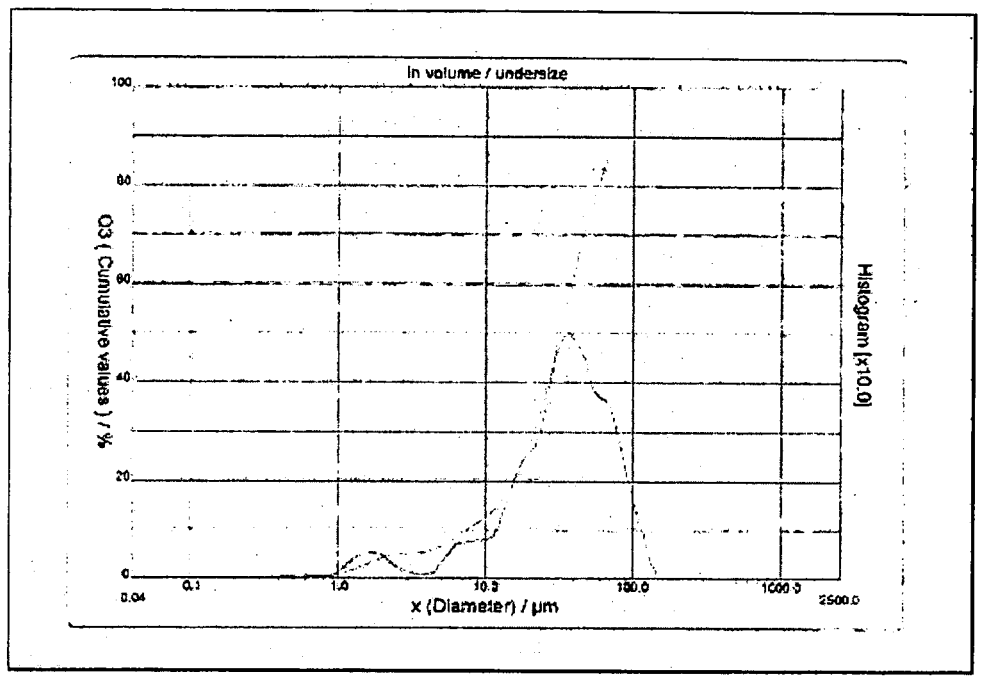
FIG. 9 shows the particle size distribution of TCP and TTCP powder produced according to the method of the present invention.

Retsch RM 100 automated mortar grinder is used for grinding TCP+TTCP powder after the firing process. The mortar grinder was loaded with 5-6 g powder for each grinding batch. The powder was set to ground at 0.1 MPa (1 bar) pressure for 1 minute with 90 rpm grinding speed. The TCP and TTCP powder obtained has particle size ranging from 1-150 microns and with median size at 30 microns, as shown in FIG. 9.

While the invention has been described in connection with certain preferred embodiments illustrated above, it will be understood that it is not intended to limit the invention to these particular embodiments. On contrary, it is intended to cover all alternatives, modifications and equivalents as may be included within the scope of the invention as defined by the appended claims.

What is claimed is:

1. A method of converting, limestone into tri-calcium phosphate (TCP) and tetra-calcium phosphate (TTCP) powder, said method comprising the steps of:
   a. synthesizing slurry apatite from limestone,
   b. spray drying the slurry apatite obtained in step (a) to obtain raw apatite powder,
   c. firing the raw apatite powder obtained in step (b) in an atmospheric furnace condition to obtain TCP and TTCP coarse powder simultaneously, wherein the atmospheric furnace condition is maintained by a continuous feed of nitrogen gas into the furnace,
   d. grinding the TCP and TTCP coarse powder obtained in step (c) to produce TCP and TTCP powder having particle size ranging from 1-150 microns and with median at ~30 microns.

2. The method according to claim 1 wherein synthesizing slurry apatite consists of dissolving the limestone in water with constant stirring overnight.

3. The method according to claim 1 wherein the limestone used has bi-modal particle size range of between 0.1-10 microns.

4. The method according to claim 3 wherein the limestone used has a median at 2 microns.

5. The method according to claim 1 wherein the limestone used has bi-modal particle size range of between 10-30 microns.

6. The method according to claim 5 wherein the limestone used has a median at 15 microns.

Figure 3:
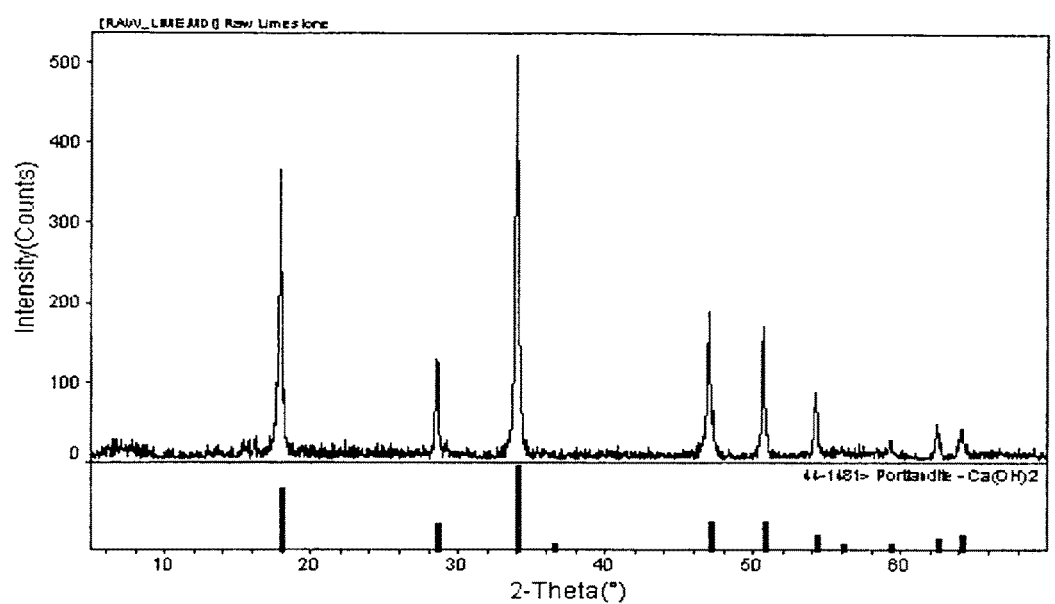
FIG. 3 shows the X-ray diffraction spectra of raw Malaysian limestone.

7. The method according to claim 1 wherein the limestone used has a crystallographic structure having an x-ray diffraction spectra as illustrated in FIG. 3.

8. The method according to claim 2 wherein ortho-phosphoric acid is added to the limestone-water mixture at a temperature of between 75° C. to 80° C.

9. The method according to claim 8 wherein the amount of the limestone used is 104.46 g±0.1 g and the volume of the ortho phosphoric acid used is 51 ml±1 ml.

10. The method according to claim 8 wherein the resulting limestone-acid mixture is left overnight with constant stirring to obtain a gelatinous apatite mixture.

11. The method according to claim 10 wherein the gelatinous mixture is left overnight with no further heating or stirring.

12. The method according to claim 11 wherein sediment of the gelatinous mixture is collected and supernatant water is discarded.

13. The method according to claim 12 wherein the sediment is washed twice with water with one wash a day, followed by collecting the resulting sediment and mixing it homogenously with double distilled deionized water (DDI water) and leaving the same overnight, collecting the sediment thus obtained and mixing it homogenously with new DDI water, and collecting the final sediment in the form of gelatinous apatite slurry.

14. The method according to claim 13, wherein the apatite slurry is stirred to form a homogenous slip, before being fed into a spray drier to obtain raw apatite powder.

15. The method according to claim 13, wherein the apatite slurry has a viscosity in the range of 50-200 cP with specific gravity of 0.9-1.2.

16. The method according to claim 14 wherein the spray drier parameters consist of inlet temperature 280° C., outlet temperature is stable ~85°-95° C., feed rate of slurry apatite at 20-45 rpm and a compressed air pressure of 0.05 MPa-0.3 MPa (0.5-3 bar).

17. The method according to claim 13 wherein the spray dried apatite powder thus obtained is single modal between 1-300 microns with median at ~55 microns.

Figure 5:
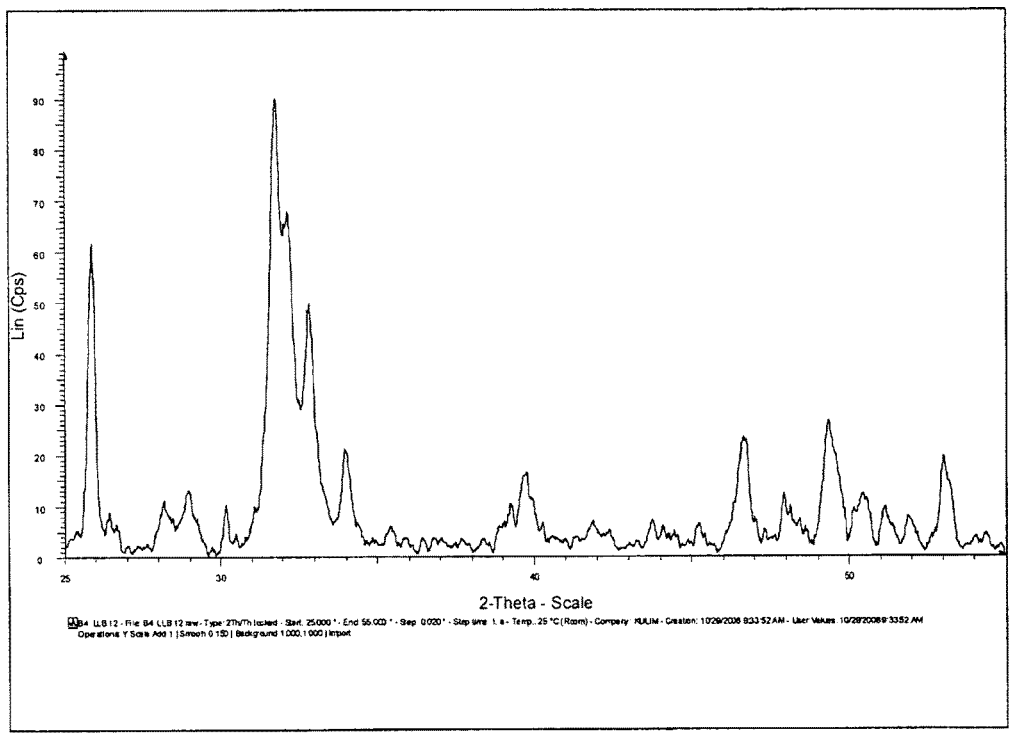
FIG. 5 shows the X-ray diffraction spectra of spray dried apatite powder before firing.

18. The spray dried apatite powder obtained according to claim 13 characterized in that the crystallographic structure of the spray dried powder has an x-ray diffraction spectra as illustrated in FIG. 5.

19. The method according to claim 1 characterized in that throughout the firing process, the firing of the raw apatite powder is carried out at a maximum temperature of 1400° C. with a soaking time for 6 hours and with a heating rate at 5° C./min using nitrogen ($N_2$) gas environment.

20. The method according to claim 1, wherein tri-calcium phosphate and tetra-calcium phosphate powder are ground at 0.1 MPa (1 bar) for 1 minute.

Figure 10:
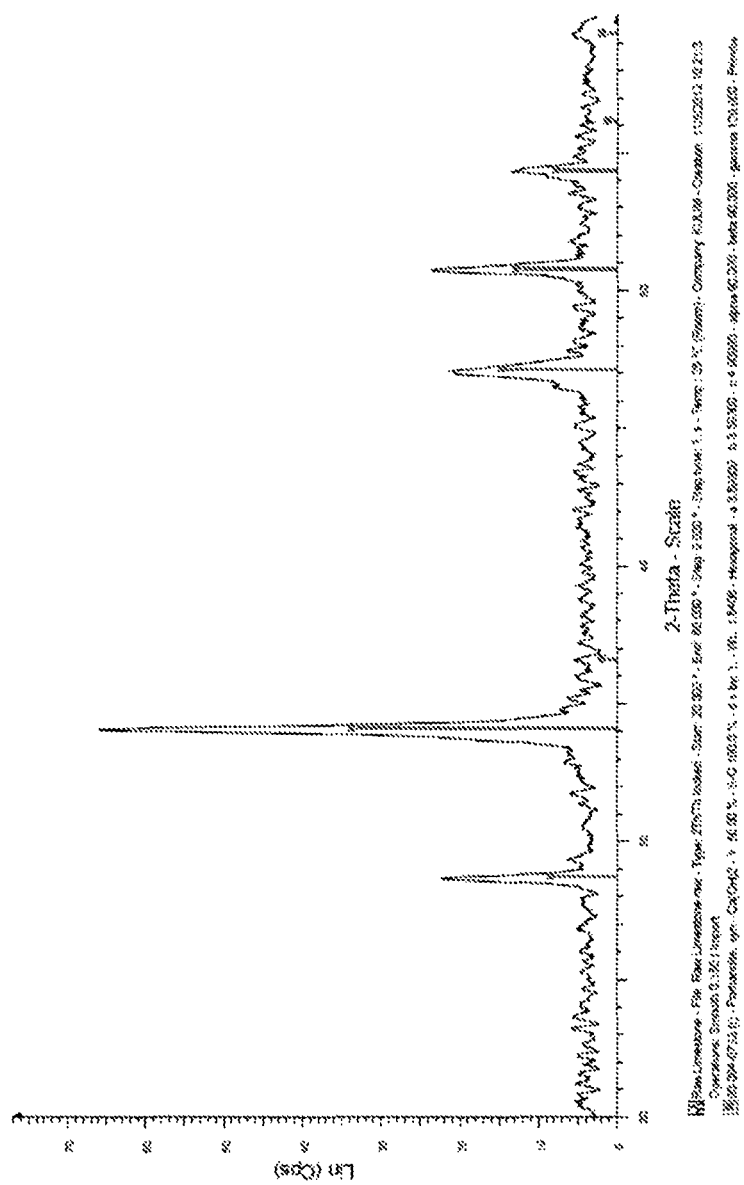
FIG. 10 is an x-ray diffraction spectra of tri-calcium phosphate and tetra-calcium phosphate powder obtained according to one embodiment of the method described herein.

21. The tri-calcium phosphate and tetra-calcium phosphate powder obtained according to claim 1 and having the x-ray diffraction spectra as illustrated in FIG. 10.

* * * * *